United States Patent
Kazyaka

Patent Number: 5,552,761
Date of Patent: Sep. 3, 1996

[54] GEAR SELECTION INDICATOR FOR MANUAL TRANSMISSIONS

[76] Inventor: Thomas V. Kazyaka, P.O. Box 1161, Gualala, Calif. 95445

[21] Appl. No.: 411,298

[22] Filed: Mar. 27, 1995

[51] Int. Cl.⁶ .................................................. B60Q 1/00
[52] U.S. Cl. ...................... 340/456; 340/438; 200/61.88; 200/61.85; 116/28.1
[58] Field of Search ...................... 340/456, 438; 116/28.1; 74/475, 473 R; 200/61.85, 61.88, 61.91

[56] References Cited

U.S. PATENT DOCUMENTS

| | | | |
|---|---|---|---|
| 1,705,069 | 3/1929 | Saurman | 340/456 |
| 3,643,622 | 2/1972 | Cryer | 116/124 |
| 3,868,923 | 3/1975 | Lambiris | 116/124 |
| 4,037,196 | 7/1977 | Atkinson et al. | 340/456 |
| 4,155,068 | 5/1979 | Zajichek | 340/456 |
| 4,158,833 | 6/1979 | Chicoine | 340/72 |
| 4,191,064 | 3/1980 | Houk et al. | 74/475 |
| 4,199,747 | 4/1980 | Miller et al. | 340/456 |
| 4,800,360 | 1/1989 | Dunkley et al. | 340/456 |
| 5,017,916 | 5/1991 | Londt et al. | 340/870 |
| 5,070,808 | 12/1991 | Poskie | 116/28.1 |
| 5,245,313 | 9/1993 | Polityka | 340/456 |

*Primary Examiner*—John K. Peng
*Assistant Examiner*—Ashok Mannava
*Attorney, Agent, or Firm*—Jack Lo; Kevin Sheehan (ITM)

[57] ABSTRACT

A gear selection indicator for manual transmissions includes a shift lever knob with lights arranged thereon for indicating the usual gear selections of "1" to "5", and "R." The lights are independently controlled by separate switches, each of which are arranged to be engaged by the shift lever at a different gear position. Moving the lever to select a particular gear causes it to engage the corresponding switch, which activates the corresponding light to provide a positive visual indication of the currently selected gear.

4 Claims, 2 Drawing Sheets

5,552,761

GEAR SELECTION INDICATOR FOR MANUAL TRANSMISSIONS

BACKGROUND OF THE INVENTION

1. Field of the Invention

This invention relates generally to motor vehicle instrumentation, specifically to a gear selection indicator for manual transmissions.

2. Prior Art

Motor vehicles with manual transmissions are generally not equipped with indicators for indicating the currently selected gear. As a result, drivers will sometimes forget the gear they are using. When they try to shift, they would either select the wrong gear, which may damage the engine, or stir the shift lever around in an effort to decide on which gear to use.

Motor vehicles with automatic transmissions are usually equipped with gear selection indicators, which are typically arranged either on a face plate next to the shift lever, or on the instrument cluster behind the steering wheel.

U.S. Pat. No. 5,070,808 to Poskie (1991) shows a gear selection indicator device for being mounted on an instrument panel. It includes a stationary set of gear selection indicia, a stationary backlight, and a movable mask positioned therebetween. The mask has an aperture thereon, and is connected by a cable to a steering-column-mounted shift lever for movement. Moving the shift lever moves the mask to selectively illuminate different parts of the indicia.

U.S. Pat. No. 3,868,923 to Lambiris (1975) shows a device with a stationary set of gear selection indicia, a movable light attached to a steering-column-mounted shift lever for simultaneous movement, and a stationary bundle of optical fibers extending between the indicia and the light.

Moving the shift lever moves the light to illuminate different parts of optical fiber bundle, which illuminates corresponding parts of the indicia.

U.S. Pat. No. 4,191,064 to Houk et al. (1980) shows a gear selection indicator device for a floor-mounted shift lever. It includes a stationary set of gear position indicia arranged on a face plate mounted around the base of the lever, and a movable light attached to the lever under the face plate. Moving the lever moves the light to selectively illuminate different parts of the indicia.

U.S. Pat. No. 3,643,622 to Cryer (1972) also shows a gear selection indicator device for a floor-mounted shift lever. It includes a display panel mounted at the base of the lever, a single stationary light positioned under the panel, and a movable mask positioned therebetween. The mask is connected to the shift lever, which moves the mask linearly under the panel. The mask is connected to a linear series of detents for locating the gear positions. The detents form part of the electrical circuit of the single light, which turns on and off when the mask is moved from one detent to another.

All prior art automatic transmission shift levers select gears in a linear manner by moving in two directions: fore-and-aft for floor mounted units, and up-and-down for steering-column-mounted units. Accordingly the aforementioned gear selection indicators cannot be adapted for use with manual transmission shift levers, which usually move in six directions in a double "H" pattern.

U.S. Pat. No. 5,017,916 to Londt et al. (1991) shows a shift prompter device for manual transmissions. It includes a multi-function digital display for mounting on the dashboard or instrument panel of a vehicle. The display includes up and down indicator arrows which are illuminated for indicating the best time to upshift or downshift, respectively. The last digit of the display is for indicating the target gear for each shift, not the currently selected gear. It is very complicated, and requires the installation of numerous unspecified sensors on the drive train. Therefore, it is not suitable for retrofitting to existing vehicles, especially by untrained end users.

OBJECTS OF THE INVENTION

Accordingly the primary object of the present invention is to provide a gear selection indicator for manual transmissions that provides a positive visual indication of the currently selected gear.

Further objects of the present invention are to provide a gear selection indicator for manual transmissions that is simple in construction, and that can be easily retrofitted to existing vehicles, or installed as original equipment on new vehicles.

SUMMARY OF THE INVENTION

A gear selection indictor for manual transmissions includes lights and indicia arranged on the knob of a shift lever for indicating the currently selected gear. Switches are arranged on a frame positioned around the base of the shift lever, and are each connected to a different light. The switches are adapted to be engaged by the lever at its various gear positions for activating a corresponding light.

Drawing Reference Numerals

10. Shift lever Knob
11. Shift lever
12. Indicia
13. Annular Mounting Frame
14. Lower Portion Of Frame
15. Cylindrical Portion Of Transmission
16. Manual Transmission
17. Hose Clamp
18. Upper Portion Of Frame
19. Slots
20. Switch Button
L1–L5, LR. Lights
S1–S5, SR. Switches

DETAILED DESCRIPTION—FIG. 1

Figure 1:
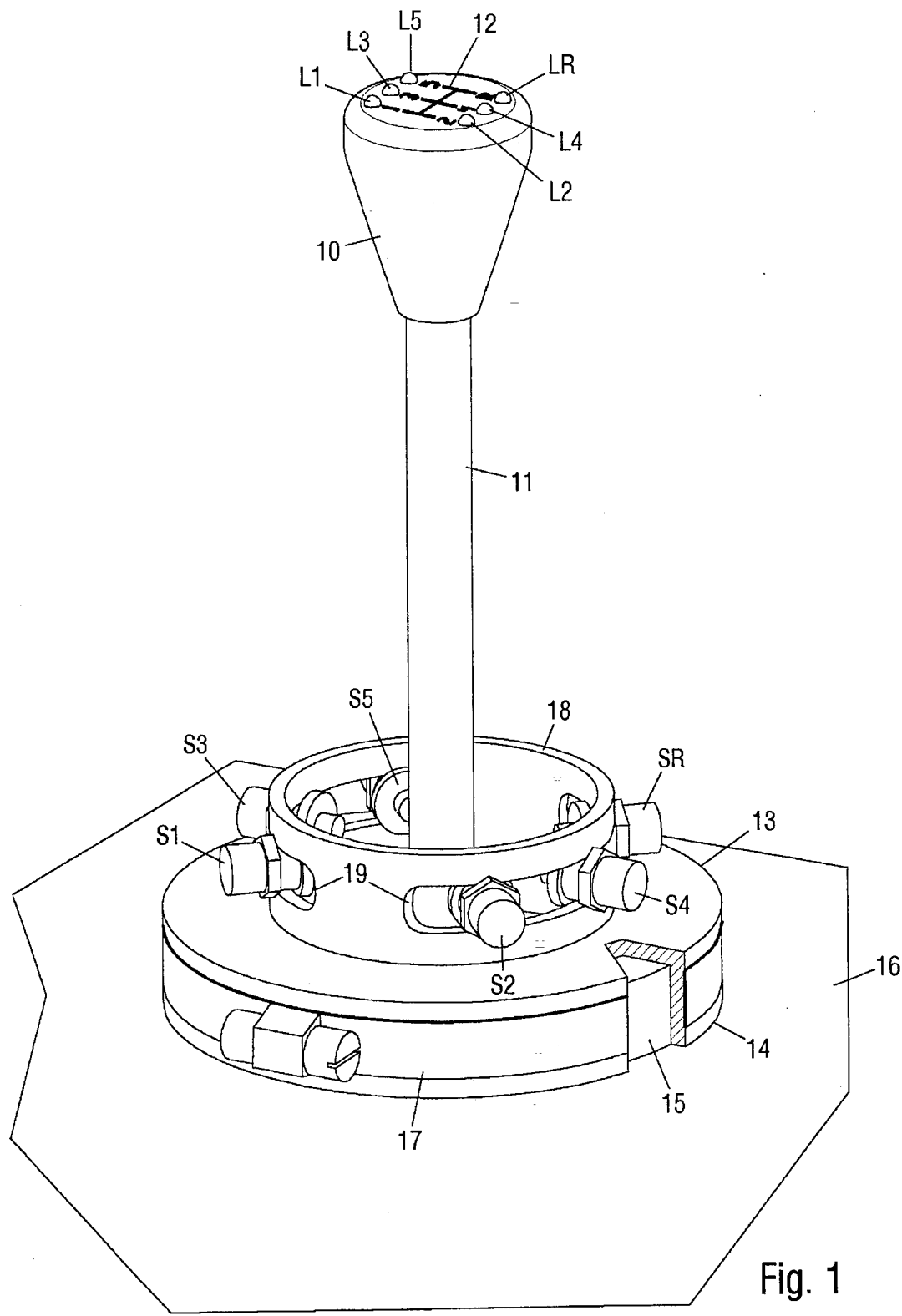
FIG. 1 is a side perspective view of a gear selection indicator for manual transmissions in accordance with a preferred embodiment of the invention.

In accordance with a preferred embodiment of the invention shown in the side perspective view in FIG. 1, a gear selection indicator includes a knob 10 having internal threads (not shown) adapted for mounting to the threaded top end of a conventional shift lever 11. Knob 10 includes indicia 12 for indicating the usual gear positions, and includes the numbers "1", "2", "3", "4" and "5", and the letter "R", which are arranged to graphically represent the shift pattern of lever 11. A set of lights L1–L5, and LR are arranged on knob 10 next to indicia "1" to "5", and "R", respectively, in two rows of three lights each that correspond to the shift pattern of lever 11.

An annular mounting frame 13 includes a lower portion 14 secured on a cylindrical portion 15 of a conventional manual transmission 16 with a hose clamp 17. Frame 13 includes a top portion 18 with a pair of horizontal slots 19 that adjustably receive normally-off, momentary switches S1–S5, and SR.

Knob 10 is installed on lever 11 as a simple, screw-on replacement of the original knob (not shown). Wires (not shown) leading to the lights can be strapped around the outside of lever 11. Cylindrical portion 15 is a common part of many transmissions, so that frame 13 can be easily retrofitted to most existing vehicles by an end user, or it can be installed as original equipment in new vehicles.

DETAILED DESCRIPTION—FIG. 2

Figure 2:
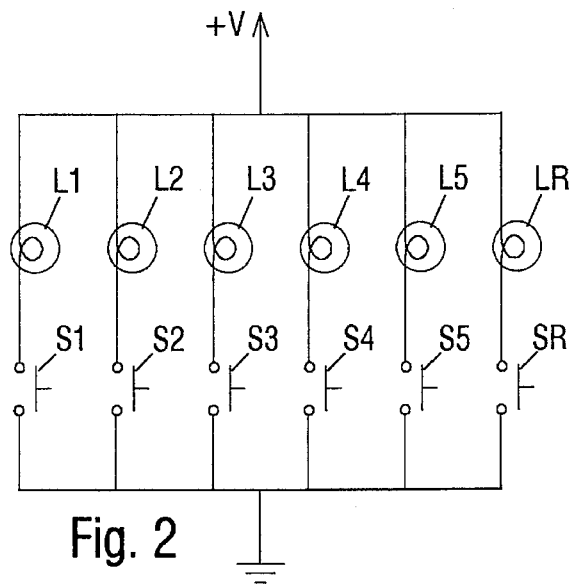
FIG. 2 is an electrical schematic diagram of the gear selection indicator.

As shown in the electrical schematic diagram in FIG. 2, lights L1–L5, and LR are connected in parallel to the electrical power source of the vehicle (not shown). Each light, which is normally-off, is independently controlled by a corresponding switch S1–S5, and SR.

DETAILED DESCRIPTION—FIG. 3

Figure 3:
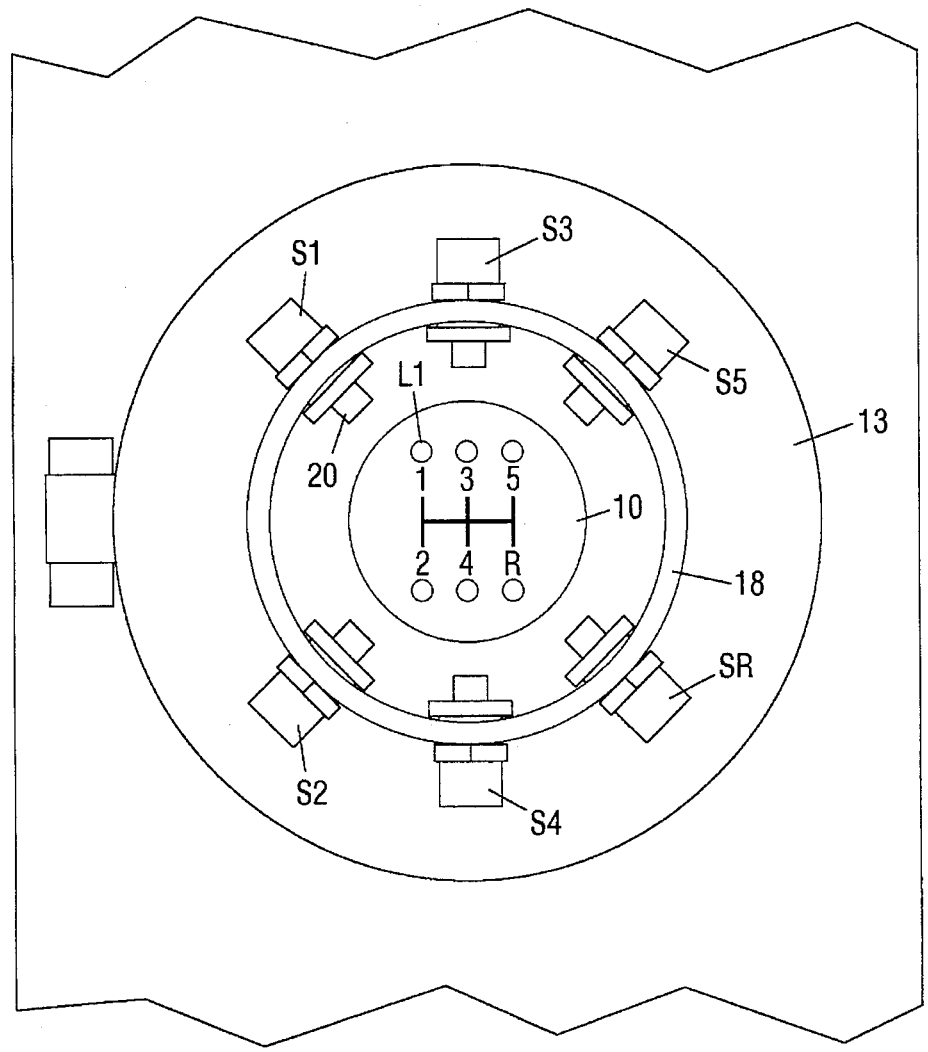
FIG. 3 is a top view of the gear selection indicator.

As shown in the top view in FIG. 3, switches S1–S5, and SR are arranged in front of and behind shift lever 11 (FIG. 1) generally in two rows for being engaged by the lever at its various gear positions. The switches can be adjusted within slots 19 (FIG. 1) for matching the shift pattern of different vehicles. Moving the lever to select first gear causes it to engage a button 20 of switch S1, which energizes light L1 on knob 10 to provide a positive visual indication that first gear is selected. Light L1 stays activated for as long as the lever remains in the same position. Moving the lever to select other gears will activate other corresponding lights to indicate which gear is selected.

Conclusion, Ramifications, And Scope

Accordingly the reader will see that I have provided a gear selection indicator for manual transmissions. It provides a positive visual indication of the currently selected gear, so that a driver can select the proper gear when shifting. It is very simple in construction, and it can be easily retrofitted to existing vehicles by most end users. Alternatively, it can be installed as original equipment in new vehicles.

Although the above descriptions are specific, they should not be considered as limitations on the scope of the invention, but only as examples of the preferred embodiment. Many other ramifications and variations are possible within the teachings of the invention. For example, the mounting frame can be differently shaped for mounting on other types of transmissions, or on other parts of a vehicle around the shift lever, such as the center console. The switches can be mounted directly to the transmission, so that the frame can be eliminated. Instead of being visually separate from the indicia, the lights can be positioned under translucent indicia for backlighting them. The lights can be replaced with light emitting diodes. The indicia can be illuminated with optical fibers, each end of which would form a separate light. The switches can simply be individual contacts that ground the lights when they touch the normally grounded lever. A different number of switches and lights can be provided for vehicles with a different number of gear ratios. The indicia used can be different for indicating different shift patterns. If the shift lever is adapted to control a transmission through a cable or rod linkage, the switches can be positioned to be engaged by portions of the linkage. Therefore, the scope of the invention should not be determined by the examples given, but by the appended claims and their legal equivalents.

I claim:

1. A gear selection indicator for a vehicle having a manual transmission and a shift lever movable to a plurality of gear positions in a predetermined pattern, comprising:

a knob adapted to be mounted on top of said shift lever;

a plurality of lights arranged on top of said knob in said pattern, each of said gear positions being represented by only one of said lights in a corresponding position in said pattern, only one of said lights being operable at any time for indicating a corresponding gear position;

a frame positioned around a lower end of said shift lever, said frame having a horizontal slot; and a plurality of switches arranged within said slot, each of said switches being movable laterally along said slot so that said switches are adjustable in lateral spacing from each other, each of said switches controlling only one of said lights, each of said switches being adapted to be engaged by said shift lever at a different one of said gear positions for activating a corresponding light.

2. The gear selection indicator of claim 1 wherein said lights are arranged in two rows of three lights each.

3. The gear selection indicator of claim 1 wherein said switches are arranged in front of and behind said shift lever in two rows of three switches each.

4. The gear selection indicator of claim 1, further including indicia disposed on top of said knob, said indicia including "1", "2", "3", "4", "5", and "R" each positioned adjacent a different one of said lights.

\* \* \* \* \*